United States Patent [19]
House

[11] Patent Number: 6,132,606
[45] Date of Patent: *Oct. 17, 2000

[54] CHIRAL STATIONARY PHASE BASED ON YOHIMBINE

[75] Inventor: David W. House, Arlington Heights, Ill.

[73] Assignee: UOP LLC, Des Plaines, Ill.

[ * ] Notice: This patent is subject to a terminal disclaimer.

[21] Appl. No.: 09/227,958

[22] Filed: Jan. 11, 1999

Related U.S. Application Data

[63] Continuation-in-part of application No. 08/977,598, Nov. 25, 1997, Pat. No. 5,858,910.

[51] Int. Cl.⁷ ..................................................... B01D 15/08
[52] U.S. Cl. ..................................... 210/198.2; 210/502.1; 210/635; 210/656; 502/401
[58] Field of Search ..................................... 210/635, 656, 210/198.2, 502.1; 502/400, 401, 407

[56] References Cited

U.S. PATENT DOCUMENTS 5,807,482  9/1998  House ................................... 210/198.2
5,858,910  1/1999  House ..................................... 502/401

OTHER PUBLICATIONS

Karagounis, Natuee, 142, (1938) pp. 162–163.
Giddings, Advances in Chromatography, vol. 10, Marcel Dekker New York 1974 pp. 99–172.
Baczuk, J. Chromatogr., 60, 351–361 (1971).
Blaschke, Chemische Berichte, 109, 1967–1975 (1976).
Okamoto, J. Cheomatography, 666 1994, pp. 403–419.

*Primary Examiner*—Ernest G. Therkorn
*Attorney, Agent, or Firm*—John G. Tolomei; Frank S. Molinaro; Maryann Maas

[57] ABSTRACT

A chromatographic process for separating racemic mixtures using a set of chiral stationary phases based on yohimbine and its derivatives has been developed. In particular, the hydroxyl functionality of yohimbine and its analogs is covalently bonded via a urethane linkage to a polymethylenesilyl chain attached to the bound hydroxyl groups of a refractory inorganic oxide by Si—O bonds. The resulting chiral stationary phases have multiple chiral recognition sites and can be used with a broad spectrum of materials as eluents without leaching.

6 Claims, No Drawings

CHIRAL STATIONARY PHASE BASED ON YOHIMBINE

CROSS REFERENCE TO RELATED APPLICATION

This application is a continuation-in-part of our application, application Ser. No. 08/977,598 filed Nov. 25, 1997, now U.S. Pat. No. 5,858,910, all of which is hereby incorporated by reference.

BACKGROUND OF THE INVENTION

Ever since Pasteur discovered the property of optical activity displayed by chiral compounds, the resolution of racemic mixtures into their enantiomeric components has posed a challenge. Substantial progress in separating enantiomeric pairs has been achieved since Pasteur's laborious hand separation of the enantiomeric crystals of racemic sodium ammonium tartrate, yet methods of resolution, and the materials used therefor, remain a formidable obstacle to commercial production of optically active organic substances.

A traditional method of resolution comprises reacting a racemic mixture with a second optically active substance to form a pair of diastereomeric derivatives. Such derivatives generally have different physical properties which permit their separation by conventional means. For example, fractional crystallization often permits substantial separation to afford at least one of the diastereomers in a pure state, or largely so. An appropriate chemical transformation then converts the purified derivative, which was formed initially solely to prepare a diastereomeric pair, into one enantiomer of the originally racemic compound. This traditional method is exemplified by the reaction of naturally occurring optically active alkaloids, for example, brucine, with racemic acids to form diastereomeric salts, with release of an optically active organic acid from a purified diastereomer upon acidification of the latter.

Such traditional methods suffer from many limitations. Generally, only one of the enantiomeric pairs can be obtained, so yields are necessarily less than 50%. The separation of the material so obtained usually is incomplete, leading to materials with enhanced rather than complete optical purity. The optically active materials used to form the diastereomers frequently are expensive and quite toxic—the alkaloids as a class are good examples—and are only partially recoverable. Regeneration of optically active material from its derivative may itself cause racemization of the desired compound, leading to diminution of optical purity. For example if optically active benzyl alcohols are prepared through their diastereomeric ester derivatives, subsequent acid hydrolysis of the latter to regenerate the alcohol may be accompanied by appreciable racemization.

With the advent of chromatography diverse variations on the basic theme of separating diastereomers became possible. These approaches undeniably represent substantial advances in the art, yet fail to surmount the basic need, and associated problems, to prepare diastereomeric derivatives of the desired compound and to transform such derivatives after separation to the optically active compounds of interest.

Chromatographic methods of separating diastereomers offer advantages of general application, mild conditions which generally preclude chemical or physical transformation, efficiency of recovery and separation which are limited only by the number of theoretical plates employed and the capability of utilization from a milligram to kilogram scale. Translation from a laboratory to industrial scale has proved feasible, and commercial processes employing chromatographic separation occupy an important position in the arsenal of available industrial methods. For such reasons, methods based on chromatographic separation remain under intensive exploration.

To circumvent the disadvantage of separating diastereomeric derivatives of a compound while retaining the advantage of chromatographic separation, recent advances in the art have employed chiral, optically active compounds in association with the chromatographic support. The theory underlying this approach is that chiral material will have differential weak interactions with enantiomers, for example, hydrogen bonding, or acid-base interactions generally. Such weak interactions lead to reversible formation of entities which we refer to as complexes, and the equilibrium constant characterizing complex formation will be different for each member of the enantiomeric pair. The different equilibrium constants manifest themselves as a differing partition coefficient among the phases in a chromatographic process, leading ultimately to separation of enantiomers.

Thus, enantiomers of some chromium complexes were resolved by chromatography on powdered quartz, a naturally occurring chiral material. Karagounis and Coumolos, *Nature*, 142, 162 (1938). Lactose, another naturally occurring chiral material, was used to separate p-phenylene-bis-iminocamphor. Henderson and Rule, *Nature*, 141, 917 (1938). However, despite this knowledge substantiating theoretical considerations, advances in the art have been tortuous at best.

A major obstacle has been development of a chiral solid phase capable of resolving, at least in principle, a broad class of racemic organic compounds, with a stability which permits repeated usage, and with adequate capacity to make separation feasible on a preparative scale. Gil-Av has made a major contribution toward one kind of solution by gas-liquid phase chromatographic resolution of enantiomers using columns coated with N-trifluoroacetyl derivatives of amino acids, di-and tri-peptides. Gil-Av and Nurok, "Advances in Chromatography", Volume 10, Marcel Dekker (New York), 1974. However, the advances suffer practical limitations originating from the need to have volatile substrates and the inability to scale up the methods employed.

Another advance is represented by the work of Baczuk and coworkers, *J. Chromatogr.*, 60, 351 (1971), who covalently bonded an optically active amino acid through a cyanuric acid linkage to a modified dextran support and utilized the resulting material in column chromatography to resolve 3,4-dihydroxyphenylalanine. A different approach is exemplified by polymerization of optically active amides with the resulting polymer used as a solid phase in liquid-solid chromatography. Blaschke and Schwanghart, *Chemische Berichte*, 109,1967 (1976).

More recently it has become an accepted reality that enantiomeric medicinals may have radically different pharmacological activity. For example, the (R)-isomer of propranolol is a contraceptive whereas the (S)-isomer is a beta-blocker. An even more dramatic and tragic difference is furnished by thalidomide where the (R)-enantiomer is a safe and effective sedative when prescribed for the control of morning sickness during pregnancy whereas the (S)-enantiomer was discovered to be a potent teratogen leaving in its wake a multitude of infants deformed at birth. This has, in part, provided the motivation for developing additional tools for chiral separations. Chromatographic processes, especially liquid chromatography, appear to offer the best prospects for chiral separations. One variant of the latter utilizes achiral eluents in combination with chiral stationary phases (CSPs), which has the critical aspect that a variety of chiral stationary phases be available to the practitioner. In recent years substantial progress has been made by developing a class of chiral stationary phases based upon derivatized polysaccharides, especially cellulose, adsorbed on a carrier such as silica gel or a modified silica gel. This recently has been summarized by Y. Okamoto, *J. Chromatog.*, 666 (1994), 403-19.

However effective may be the aforedescribed supports based on polysaccharides, there remains a need for chiral stationary phases where chirality is imparted by a monomer rather than by oligomers or polymers as represented by the polysaccharides. To be optimally useful the chiral monomer should have a plurality of chiral sites, so as to offer several chiral recognition sites and afford the potential of being broadly used in chiral separations. An appropriate monomer should afford a CSP based on covalent linkage of the monomer to the underlying carrier; covalently attaching the chiral monomer to a carrier virtually eliminates leaching, regardless of the mobile phase, and permits one to use many more types of mobile phases and to switch from forward to reverse phase eluents using the same column without fear of destroying the CSP due to leaching or plugging of the column. This benefit makes such CSPs much more effective for traditional single pass chromatography, for recycle-type chromatography, for simulated moving bed-based chromatography, and simple preferential adsorption of one enantiomer over the other.

The use of a monomeric chiral host containing several chiral centers providing a plurality of potential chiral interactions offers the possibility of a chiral stationary phase manifesting broad chiral discrimination. Yohimbinic acid is a chiral material with several easily derivatizable sites making this chiral host readily modifiable to "tune" its selectivity according to the racemate to be resolved. Covalent attachment of yohimbinic acid to the underlying carrier via its carboxylic acid function affords a useful series of chiral stationary phases, but use of the carboxylic acid functionality as the site of attachment does have some unwanted features. Modeling indicates that the chiral sites are more hindered by the surface of the carrier when yohimbinic acid is attached via the acid moiety as opposed to its attachment via the hydroxyl moiety. While some steric hindrance is desirable as a means to promote chiral selectivity, too much hindrance will actually limit access of both enantiomers to the active chiral sites, leading to decreased chiral recognition and poorer separations. Such hindrance will also decrease the number of different types of racemates which the chiral support can separate.

Attaching the yohimbinic structure to the carrier via the hydroxyl group instead of the acid moiety offers a slightly different chiral surface to the racemates. This variation increases the versatility of the yohimbinic acid structure, and it may also increase the number of possible racemates that may be separable. However, there are possible drawbacks to simply attaching yohimbinic acid to the carrier via the hydroxyl group. One is that the free acid moiety is likely to interfere with any reaction designed to couple the hydroxyl group to the carrier. Even if such a reaction is successfully carried out, there is a free carboxylic acid moiety available to interact with any racemate approaching the chiral discriminator since the carboxylic acid moiety is the most polar group in yohimbinic acid. In other chiral stationary phases where chiral recognition occurs using polar interaction, free carboxylic acid sites may significantly hinder, if not completely negate, chiral selectivity. Therefore, if the yohimbinic structure is to be attached to a carrier, it is desirable and perhaps imperative that the carboxylic acid moiety be blocked, as by forming an alkyl ester. Yohimbine is the methyl ester of yohimbinic acid.

In this application we take advantage of covalent attachment of yohimbinic acid esters, whose primary example is yohimbine, to the underlying carrier via the free hydroxyl group. The use of this monomer should lead to chiral stationary phases with good mass transfer properties more similar to brush-type stationary phases, whereas CSPs based on high carbon-loaded derivitized cellulosics show impaired mass transfer properties. Yohimbine-based CSPs according to our invention described within may be expected to be effective in both analytical and preparative chromatography, especially simulated moving-bed chromatography.

SUMMARY OF THE INVENTION

The purpose of our invention is to provide chromatographic processes for separating a mixture of racemates using a variety of covalently bonded chiral stationary phases based on yohimbine and analogous esters manifesting broad chiral discrimination. An embodiment uses yohimbine or an analogous ester of yohimbinic acid covalently bonded to an underlying silica carrier via an alkylsilyl spacer as the chiral stationary phase. A specific embodiment of this variant is one where a urethane group formed from the hydroxyl group of yohimbine and an isocyanato group is the covalent link bonding yohimbine to the spacer molecule. In a more specific embodiment the CSP is the yohimbine urethane of propylsilanized silica. Other embodiments will be apparent from our ensuing description.

DESCRIPTION OF THE INVENTION

The need for broadly-effective, "general-purpose" chiral stationary phases reflects the need for chiral stationary phases having 1) an organic monomer as the chiral recognition agent and 2) the potential to have broad chiral discrimination associated with a plurality of chiral sites. Because a CSP with covalently bound organic material can be expected to be more stable toward leaching and to afford somewhat greater flexibility in operating conditions, this type of CSP often is preferred over one where the organic material is merely coated on a carrier. Our invention fills these needs by using yohimbine and its analogs (i.e., the esters of yohimbinic acid) as the chiral organic material with a multiplicity of chiral recognition centers. Yohimbine and its analogs are covalently bound to the underlying carrier via an alkylsilyl spacer. Because yohimbine has multiple functionality, several sites may be derivatized independently to alter and customize chiral recognition for optimum resolution of specific enantiomeric pairs.

The chiral stationary phases of our invention consist of a carrier, which is a refractory inorganic oxide, and yohimbine or an analog thereof, where the yohimbine or analog thereof is covalently bound to the carrier via a spacer.

The carriers of our invention are refractory inorganic oxides which generally have a surface area of at least about 35 $m^2/g$, preferably greater than about 50 $m^2/g$ and more desirably greater than 100 $m^2/g$. There appears to be some advantage to working with materials having as high a surface area as possible, although many exceptions are known which preclude making this a general statement. Suitable refractory inorganic oxides include alumina, titania, zirconia, chromia, silica, boria, silica-alumina and combinations thereof. Of these, silica is particularly preferred as a carrier in chromatographic separations. Since the chiral stationary phase is yohimbine or an analog thereof covalently bonded to the underlying carrier, it is required that the carrier have bound surface hydroxyl groups, so that the latter may form one end of a tether which results from reaction of the bound surface hydroxyl groups with a silane functionality on a compound to form a covalent OSi bond as part of the structure, carrier-OSi-spacer. The progenitor of the spacer portion of our invention has the formula $(RO)_x SiHal_y(CH_2)_n$—NCO. The silane part of our spacer progenitor contains either halogen, Hal, or alkoxy groups, RO, either alone or in combination. Chlorine is by far the most common halogen which may be used in the practice of our invention, although bromine also may be used equally well. As for the alkyl group of RO, R may be any alkyl group, but preferably is a lower alkyl having from 1 through about 6 carbon atoms, with 1 and 2 carbon alkyl groups particularly desirable. The silicon atom is separated from the nitrogen atom by a chain of methylene groups, $CH_2$. The length of this chain is given by n which is an integer between 1 and about 12, with n=2 to 4 especially desirable. The subscripts x and y also are integers where their sum is equal to 3. A suitable progenitor of the spacer portion of our invention merely has a nonreactive group between the silicon atom and the nitrogen of the isocyanato group. Thus, another equally viable progenitor of the spacer portion of our invention is one where the methylene chain is replaced by an aromatic group, as in $(RO)_x SiHal_y$—

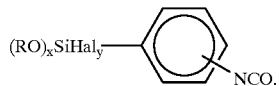

NCO. Similarly, substituted aromatic groups such as substituted phenyl groups are also suitable. Thus, the progenitor of the spacer portion of our invention may be expressed as $(RO)_x SiHal_y(Q)_n$—NCO where Q is alkyl group, phenyl group, or substituted phenyl group. Other suitable progenitors will be apparent to the skilled worker. For ease of explanation, the discussion below depicts the progenitor of the spacer portion as a chain of methylene groups.

Yohimbine and its analogs in all cases constitute the chiral organic material in the chiral stationary phase of our invention. For convenience, yohimbine itself is given by the formula, ($R_1=CH_3$, $R_2=H$).

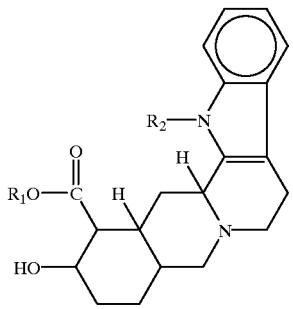

One notes that yohimbine contains two centers other than the hydroxyl group which are easily substituted or derivatized, giving rise to the variables $R_1$ and $R_2$. $R_1$ is selected from the group consisting of alkyl moieties containing from 1 up to about 20 carbon atoms, and aryl and aralkyl moieties containing from 7 up to about 20 carbon atoms, although the variant where $R_1$ is a lower alkyl group containing 1 through about 6 carbon atoms is favored. $R_2$ is selected from the group consisting of hydrogen, alkyl moieties containing from 1 up to about 20 carbon atoms, alkylaminocarbonyl moieties having 2 to 10 carbon atoms, arylaminocarbonyl moieties having 6 to about 10 carbon atoms, and acyl moieties containing from 2 up to about 20 carbon atoms.

Covalent bonding to the underlying carrier occurs via the hydroxyl portion of the yohimbine. A generalized representation of the resulting covalently bonded chiral stationary phase is given below:

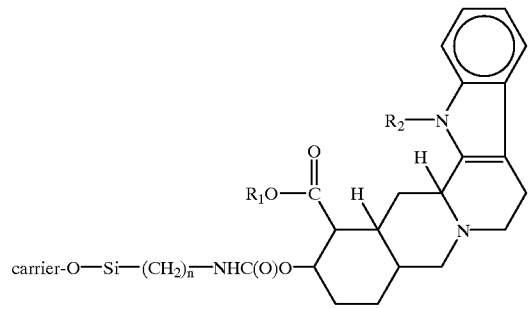

The groups $R_1$ and $R_2$ have been defined above. The yohimbine or analog thereof may be present in an amount from about 0.2 up to about 8 wt. % based on the finished chiral stationary phase. Formation of the CSP results from the reaction of the isocyanate group in an isocyanotoalkyl-silyl material with the hydroxyl functionality in yohimbine or an analog thereof to form a urethane linkage. Whether the urethane is first formed with later reaction of the silyl functionality with the bound surface hydroxyl groups of the carrier, or whether the urethane is formed after reaction of the silyl functionality with the bound surface hydroxyl groups of the carrier, is a matter of choice and is not fundamental to the outcome of our inventions. These two variants can be represented by the following equations (where ZOH represents yohimbine and its analogs).

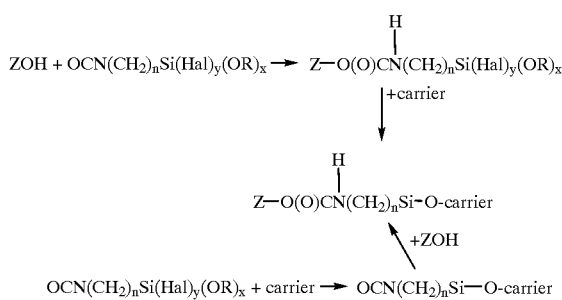

As discussed earlier, the yohimbine-based CSPs are expected to be effective in both analytical, preparative, or industrial chromatography, and especially in simulated moving bed chromatography. The racemate to be separated is introduced to the yohimbine-based CSPs with the separated enantiomers being collected as product. Examples of specific racemates expected to be successfully separated by chromatographic processes using the yohimbine-based CSPs include racemic mixtures of: benzyl and substituted benzyl alcohols having a chiral center at the benzylic carbon; benzyl and substituted benzyl amines having a chiral center at the benzylic nitrogen; aromatic alkylamides and alkylamines where the amines or amides are part of or adjacent to a chiral center; N-acylated, esterified amino acids, benzoin, flavanone, indanol, tetralol, α-methyl-2-naphthalenemethanol; 1-phenethyl alcohol, 2,2,2-trifluoro-1-phenylethanol; warfarin; 2,2,2-trifluoro-1-(9-anthryl)-ethanol; ester derivatives of aminoacids, NSAIDs (such as naproxen, ibuprofen, and ketoprofen); β-blockers (such as propanolol, pindolol, and atenolol); verapamil, steroids, aryl-substituted hydantoins; sulfoxides; bi-2-napthols; bi-2-napthylamines, and benzodiazapines.

The example which follows merely illustrates some specific embodiments of our invention, which is not limited thereto. Other variants and embodiments will be clear to the skilled artisan.

EXAMPLE 1

Chiral Stationary Phase Based on (+)-Yohimbine: To a 100 mL, three-necked, round-bottomed flask equipped with a reflux condenser, a thermometer (attached to a Therm-o-watch temperature controller), a Teflon-coated stirring bar, and a heating mantle, was added 1.00 g (2.821 mmol) of (+)-yohimbine (the methylester of (+)-yohimbinic acid) and 40 mL of a mixture of dry pyridine and benzene. Other hindered bases, such as triethylamine, may used instead of pyridine provided that the hindered bases not react with the system other than to function as a catalyst. Similarly, other inert solvents such as toluene may be used in place of the benzene described here. The purpose of the inert solvent is to aid in the solubility of the reactants. To the top of the condenser were attached a 10 mL equilibrated dropping funnel and a nitrogen line. Into the dropping funnel was added 0.734 g (2.821 mmol) of 3-isocyanatopropyltriethoxysilane (95%, Huls America) dissolved in about 10 mL of dry pyridine. The flask contents were stirred, heated to 80° C., and the isocyanate was slowly added over a 15 minute period. The benzene was distilled from the reaction until the temperature reached 90° C., then the reaction was allowed to proceed for about 24 hours more. The reaction progress may be followed by FT-IR.

After 24 hours, the contents (now containing the urethane product from the reaction of the hydroxyl moiety of the yohimbine with the isocyanate group of the organosilane) were stripped of a portion of the pyridine in order to reduce the reflux temperature of the next step in the process. The pyridine removed was replaced with dry benzene. Stripping may be carried out using a stream of dry nitrogen or by pouring the contents into a 100 mL, single-necked, round-bottomed flask and stripping the pyridine from the reaction mixture using a rotary evaporator (set at 85° C.) and reduced pressure. The residue was returned to the same 100 mL reaction apparatus, which was equipped as before except the dropping funnel was removed and a Dean-Stark trap was added between the flask and the condenser. The nitrogen line was attached to the top of the condenser.

To the reaction residue were added 60 mL of benzene followed by 4.00 g of 5μ silica gel. The slurry was gently stirred and the reaction mixture brought to reflux. Periodically, about 20 mL of benzene were removed from the trap and replaced with fresh, dry benzene. At the end of 16 hours, the reaction was stopped and the contents filtered on a 60 mL (M) sintered glass funnel. The filter cake was washed sequentially (3×30 mL) with pyridine, acetone, methanol, acetone, and pentane then air dried in the funnel. The modified silica gel was fully dried in a vacuum oven at 5 torr for 3 hours at about 60° C. to yield the chiral stationary phase as a powder.

I claim as my invention:

1. A chiral stationary phase represented by:

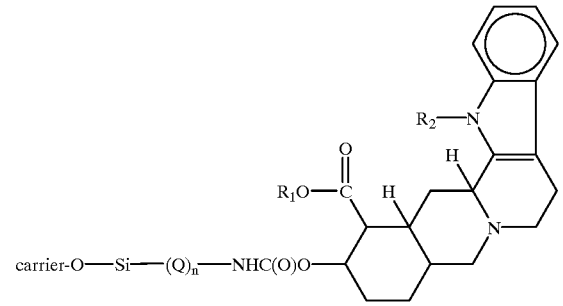

where carrier represents a refractory inorganic oxide having bound surface hydroxyl groups, O—Si is the covalent bond between the bound surface hydroxyl groups of said refractory inorganic oxide and silicon, where Q is selected from the group consisting of alkyl, phenyl, and substituted phenyl and n is an integer from about 1 to about 12, where $R_1$ is selected from the group consisting of alkyl moieties containing from 1 up to about 20 carbon atoms, and aryl and alkaryl moieties containing from 7 up to about 20 carbon atoms, and where $R_2$ is selected from the group consisting of hydrogen, alkyl moieties containing from 1 up to about 20 carbon atoms, alkylaminocarbonyl moieties having two to 10 carbon atoms, arylaminocarbonyl moieties having 6 to about 10 carbon atoms, and acyl moieties containing from 2 up to about 20 carbon atoms.

2. The chiral stationary phase of claim 1 where the refractory inorganic oxide is silica.

3. The chiral stationary phase of claim 1 where $R_1$ is methyl and $R_2$ is hydrogen.

4. The chiral stationary phase of claim 1 where $R_2$ is hydrogen.

5. The chiral stationary phase of claim 1 where $R_1$ is an alkyl having from 1 up to about 6 carbon atoms.

6. A chiral stationary phase comprising a carrier of a refractory inorganic oxide covalently bonded via bound surface hydroxyl groups to silicon atoms contained in a spacer agent of formula $(RO)_x Hal_y Si(Q)_n NHC(O)—$, where Q is selected from the group consisting of alkyl, phenyl, and substituted phenyl, R is an alkyl group, Hal is a halogen, x and y are integers such that x+y=3, and n is an integer from 1 up to about 12, and where said spacer agent is covalently bonded at the carbonyl carbon atom to the hydroxyl group of yohimbine and its analogs.

* * * * *